Figure 1:
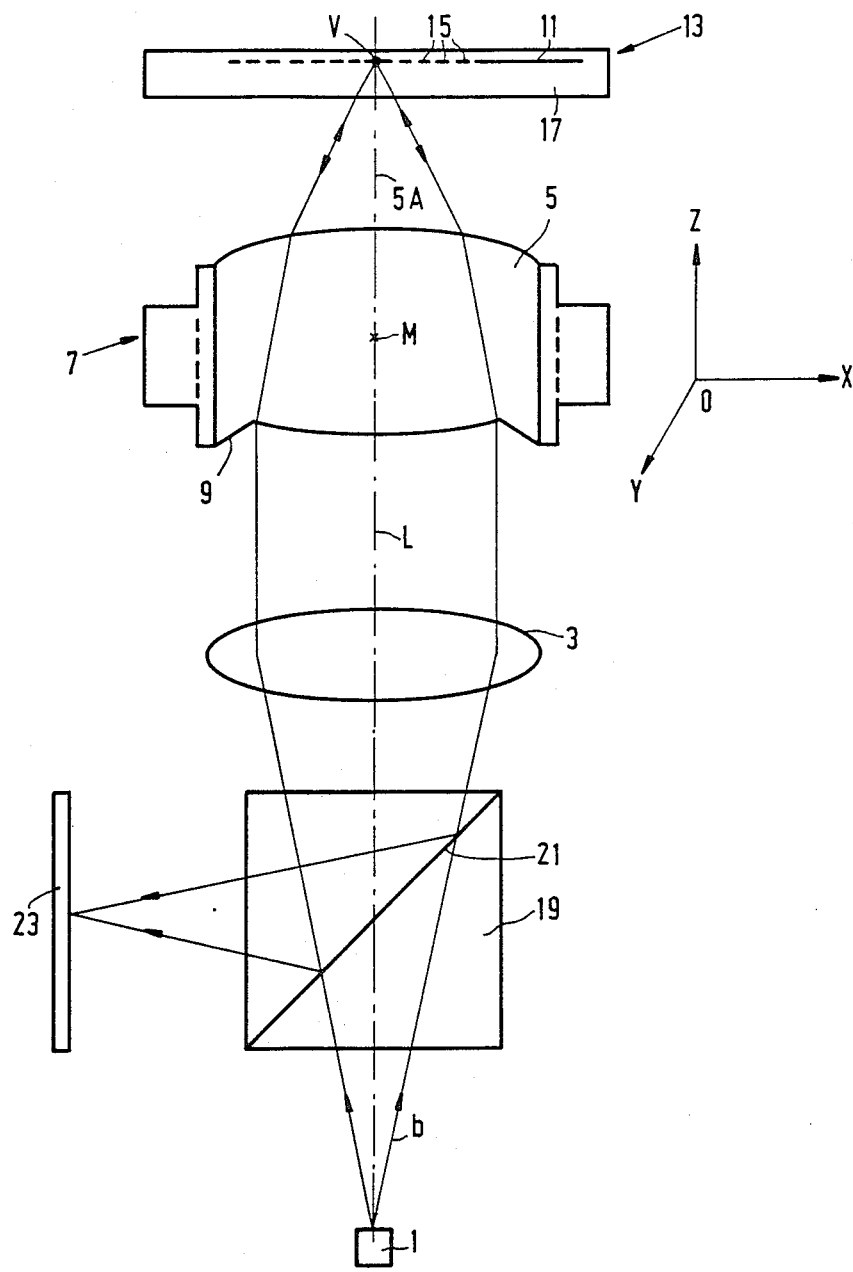

United States Patent [19]

Meyer et al.

[11] Patent Number: 4,747,668

[45] Date of Patent: May 31, 1988

[54] OPTICAL SCANNING UNIT

[75] Inventors: Karl-Hanns Meyer, Aachen, Fed. Rep. of Germany; Wilhelmus A. H. Gijzen, Eindhoven, Netherlands; Willy J. J. Aerts, Eindhoven, Netherlands; Gerard E. Van Rosmalen, Eindhoven, Netherlands; Leonhard Honds, Aachen, Fed. Rep. of Germany

[73] Assignee: U.S. Philips Corporation, New York, N.Y.

[21] Appl. No.: 889,020

[22] Filed: Jul. 24, 1986

[30] Foreign Application Priority Data

Aug. 14, 1985 [DE] Fed. Rep. of Germany ....... 3529090
Aug. 14, 1985 [DE] Fed. Rep. of Germany ....... 3529091
Nov. 25, 1985 [NL] Netherlands ..................... 8503238

[51] Int. Cl.$^4$ .................. G02B 7/11; H02K 1/00; H02K 3/00
[52] U.S. Cl. ................... 350/247; 310/12; 318/115; 318/135; 350/255
[58] Field of Search ............ 350/247, 255, 242; 369/44–45; 310/10, 12; 318/38, 115, 135

[56] References Cited

U.S. PATENT DOCUMENTS 4,421,997 12/1983 Forys ........................ 318/135
4,510,421 4/1985 Schwarzler ................. 318/135
4,602,848 7/1986 Honds et al. ................ 350/247
4,643,522 2/1987 Takashima ................. 350/255

FOREIGN PATENT DOCUMENTS 162472 8/1985 Japan ........................ 310/12

Primary Examiner—William H. Punter
Attorney, Agent, or Firm—Algy Tamoshunas

[57] ABSTRACT

An optical scanning unit with an objective for focussing a beam into a scanning spot on the surface of an information carrier and an electromagnetic drive for continuous correction of the position of the objective with respect to the information carrier. The objective is mounted in a movable ring-shaped magnetic body of a permanent-magnetic material which is arranged coaxially about the optical axis and which has magnetic poles at the axial ends. The drive is provided with sets of fixed coils which interact with the magnetic body via an air gap. Each set of coils has a first segmental coil arrangement having two active coil parts extending parallel in the peripheral direction of the magnetic body and located in the vicinity of the axial ends of the centrally positioned magnetic body. The unit is further equipped with at least one second coil arrangement which is positioned at least partially between the active coil parts of the above-mentioned first segmental arrangement.

16 Claims, 12 Drawing Sheets

OPTICAL SCANNING UNIT

The invention relates to an optical scanning unit for the control and alignment of a beam of rays on recording tracks of an information carrier surface. Such a scanning unit has an objective with an objective lens for focussing the radiation beam into a scanning spot on the said surface. The scanning unit also has an electromagnetic drive device for continuously correcting the position of the objective with respect to the information carrier. The drive device is fitted with an objective mount for the objective. The objective mount has a moving, annular magnetic body of permanent-magnet material which is equipped with magnetic poles at its axial ends and which interacts magnetically through an air gap with at least three sets of fixed coils mounted in the drive. The coil sets are arranged at equal distancs from one another when seen in the peripheral direction of the magnetic body.

Such an optical scanning unit is known from German Pat. No. 32 34 288 which corresponds to U.S. Pat. No. 4,602,848, herewith incorporated by reference. In this known scanning unit the objective is fixed in a moving, axially permanently-magnetized sleeve with two axial ends as the magnetic poles. The fixed-mounted segmental coils are in the form of flat banana-shaped coils with two coil parts extending axially with respect to one another and the said sleeve. Upon excitation of the segmental coils, the current in the coil parts concerned flows in the opposite direction.

With the known arrangement of the coils, it is possible to produce three forces directed along the three coordinate axes of an orthogonal system of coordinates, as well as two turning moments acting about two of the coordinate axes.

By means of the drive of the known scanning unit it is possible in principle to achieve all desired movements of the objective. These movements include an axial movement which is parallel to the optical axis of the objective and is used for focussing the a light beam onto an information surface of a rotating optical disc, as well as two radial movements at right angles to one another and/or two tilting movements about two axes running at right angles to one another and to the optical axis, the latter four movements being used for the radial and tangential track following of the light spot.

The known drive unit has the disadvantage, however, that the magnetic forces between the coils and the magnetic sleeve vary as a function of the axial displacement of the objective in such a way that even with a small axial displacement of the objective from the central position between the coil sets, the drive is no longer capable of moving the objective satisfactorily so as to achieve the necessary focussing of the light beam and the necessary track following of the light spot. The widely separated coil sets are suitable, in fact, for achieving sufficient movement along the optical axis, but the possibility of producing the other movements decreases so rapidly that even at a small distance from the central position the objective is no longer adequately driven as to be able to guarantee track following of the light spot.

It is the object of the invention to create an optical scanning unit of the type mentioned in the preamble which is provided with coils in such a way that the forces required for forcussing movement and the forces required for track following remain constant or almost constant as the objective is moved over a fairly large distance.

The optical scanning unit of the invention has the added feature in that each coil set has a first segmental coil with two active coil parts at the same axial distance from the magnetic body and extending round it. Each coil part is located in the vicinity of one of the axial ends of the centrally positioned magnetic body and the two coil parts are connected to one another by axially directed further coil parts. The unit has at least one additional coil which is positioned at least partially between the active coil parts of the above-mentioned first segmental coil.

The scanning unit of the invention has the advantage that when the coils are excited, the axially and radially directed forces, which the coils exert on the magnetic body, remain almost constant when the objective is moved over a distance which is sufficient for focussing a light spot and keeping it focussed on the information surface of an optical disc.

A further advantage of the scanning unit of the invention is the high efficiency of the drive during axial movement of the objective. This high efficiency is the result of the favourable shape and alignment of the first segmental coils because the majority of the active parts of the first segmental coils are in regions of high magnetic field intensity.

The scanning unit of the invention has the further advantage that, at least in terms of its structural length, the objective mount can be small. This is important because a flat objective mount makes it possible for its center of gravity to be made to coincide with the center of gravity of the objective flange. This means that unwanted tilting of the objective can be avoided when it is being moved radially.

In a preferred embodiment which can be produced in a simple manner and which offers sufficient control possibilities, each of the above-mentioned sets has two second coils extending parallel to one another and in the form of second segmental coils. These second coils lye alongside one another when seen in the axial direction of the magnetic body, each of them having a coil part facing the magnetic body and extending in its peripheral direction and a coil part further removed from the magnetic body.

The above described coil configuration of the invention makes it possible to excite the second segmental coil of each set so as to move the objective in directions at right angles to the optical axis and to excite the first segmental coil of each set so as to move the objective along the optical axis. The complete first segmental coils can, if desired, also be used for tilting the objective about axies at right angles to the optical axis. This means that the first segmental coils of the drive device have to be actuated for focussing a light beam into a light spot onto an information surface of an optical disc and that the second segmental coils have to be actuated for the radial and tangential track following of the light spot, where appropriate with selective actuation of the first segmental coils. It should be noted that the coil configuration described here can be used throughout with a simple axially magnetized magnetic body.

Another favourable embodiment has the characteristic feature that each of the sets has two second coils as second segmental coils alongside one another when seen in the axial direction of the magnetic body. Each of the second coils has two active coil parts at the same axial distance from the active body and extending around it. One of the active parts is adjacent to the magnetic body and connected to the other active coil part by further coil parts at an angle to the magnetic body. The other active coil part is located opposite the magnetic pole at one of the ends of the magnetic body.

The second segmental coil in this embodiment are shaped and aligned with respect to the magnetic body in such a way that by far the majority of these segmental coils lie in favourable regions of the magnetic field of the magnetic body. This means that a high efficiency can be obtained with smaller diametric dimensions of the drive device in the case of both axial and radial driving.

In a further embodiment in which the magnetic body comprises permanent-magnetic parts placed axially on top of one another, each of the sets contains a second, annular coil extending in a radial plane about the magnetic body.

The coil parts positioned at the outside in the present state of the art which are now arranged at the same distance from the magnetic body as the coil parts which were previously only on the inside and were active, are now also active with respect to the control system. This is based on the fact that in the case of a multi-part permanent-magnetic body, in which the magnetic parts are magnetized differently, there are magnetic field areas in which both the previously active parts on the inside and the outside non-active parts at the present state of the art can now also be active. Because the coil parts previously at the outside are now brought closer to the magnetic body, the diameter of the device becomes smaller and space is made available for other components.

Furthermore, the annular coil in the central radial plane produces essentially axial actuating forces for focus adjustment of the magnetic body. The coil preferably produces radial actuating forces which act on the magnetic body. Thanks to this subdivision of coils it is possible to employ the actuating forces more systematically during the excitation of the coils.

An optical scanning unit constructed in this way acts as a three-axis actuator with three components of motion at right angles to one another. This considerably simplifies the coil system while retaining the preferred actuating forces in the radial and axial directions.

In a further embodiment of the invention in which the optical scanning unit for the control and alignment of a beam of rays on recording tracks of a surface being scanned has an objective with an optical axis which is equipped with an objective lens for focussing the beam of rays into a scanning spot on the said surface, and, in addition, has an electromagnetic drive device for the continuous correction of the position of the objective with respect to the information carrier, wherein the drive device is equipped with an objective mounting for the objective, this objective mounting has a moving ring-shaped body arranged coaxially with the optical axis, which is equipped at the ends with magnetic poles and consists of permanent-magnetic parts superimposed axially one on the other and wherein the drive device is further equipped with fixed coils which interact magnetically with the said magnetic body via an air gap and which contain at least three segmental coil sets each with two segmental coils, these sets being arranged at equal distances alongside one another when seen in the peripheral direction of the magnetic body, the optical scanning unit is characterized by the fact that each individual segmental coil has two active coil parts at an equal axial distance from the magnetic body and extending around it, one of these coil parts being located in the vicinity of the centrally positioned magnetic body and the other coil part being displaced axially towards the centre of the magnetic body, the said two coil parts being connected by axially running coil parts. With this scanning unit it is possible to achieve two rotating moments about two of these axes in addition to the components of motion at right angles to one another. This, therefore, gives a five-axis actuator.

According to a further embodiment of the invention an annular coil, located between the said segmental coils of the coil sets, extends in a circle around the centre of the magnetic body in a radial plane. The toroidal coil makes it possible to amplify the axial actuating components.

According to a further embodiment of the invention, all the segmental coils of the segmental coil sets and the annular coil consist of laminar conductors which are provided on a cylindrical carrier which encloses the magnetic body. In this way the coils can be made extraordinarily flat and build on a cylindrical shell. The manufacture of the coil sets is easy to perform technically and is ideally suited to mass production.

According to a further embodiment of the invention, an intermediate part, which is non-magnetic, soft-magnetic or also permanent-magnetic, is arranged between the permanent-magnetic parts of the magnetic body.

If the intermediate part is non-magnetic, the dynamic effects in the radial and axial directions can be separated more effectively. If the intermediate part is ferromagnetic, then the radial component can be amplified. If the intermediate part is permanent-magnetic, then the radial component can be amplified even further. Alltogether this means that by inserting the intermediate part it is possible to obtain properties of the system (magnet/coil configuration) which cannot be achieved without it.

According to a further embodiment of the invention, the parts of the magnetic body are permanently magnetized in opposing directions. This form of magnetization is the easiest to achieve technically.

According to another embodiment of the invention, the north poles of the parts of the magnetic body are oriented in the direction of the intermediate part and the north poles of the intermediate part are oriented towards its outside wall. Conversely, it is equally possible to reverse the north pole orientation so that the north poles of the parts are oriented towards the axial ends and the north poles of the intermediate part towards its inside wall.

Figure 2:
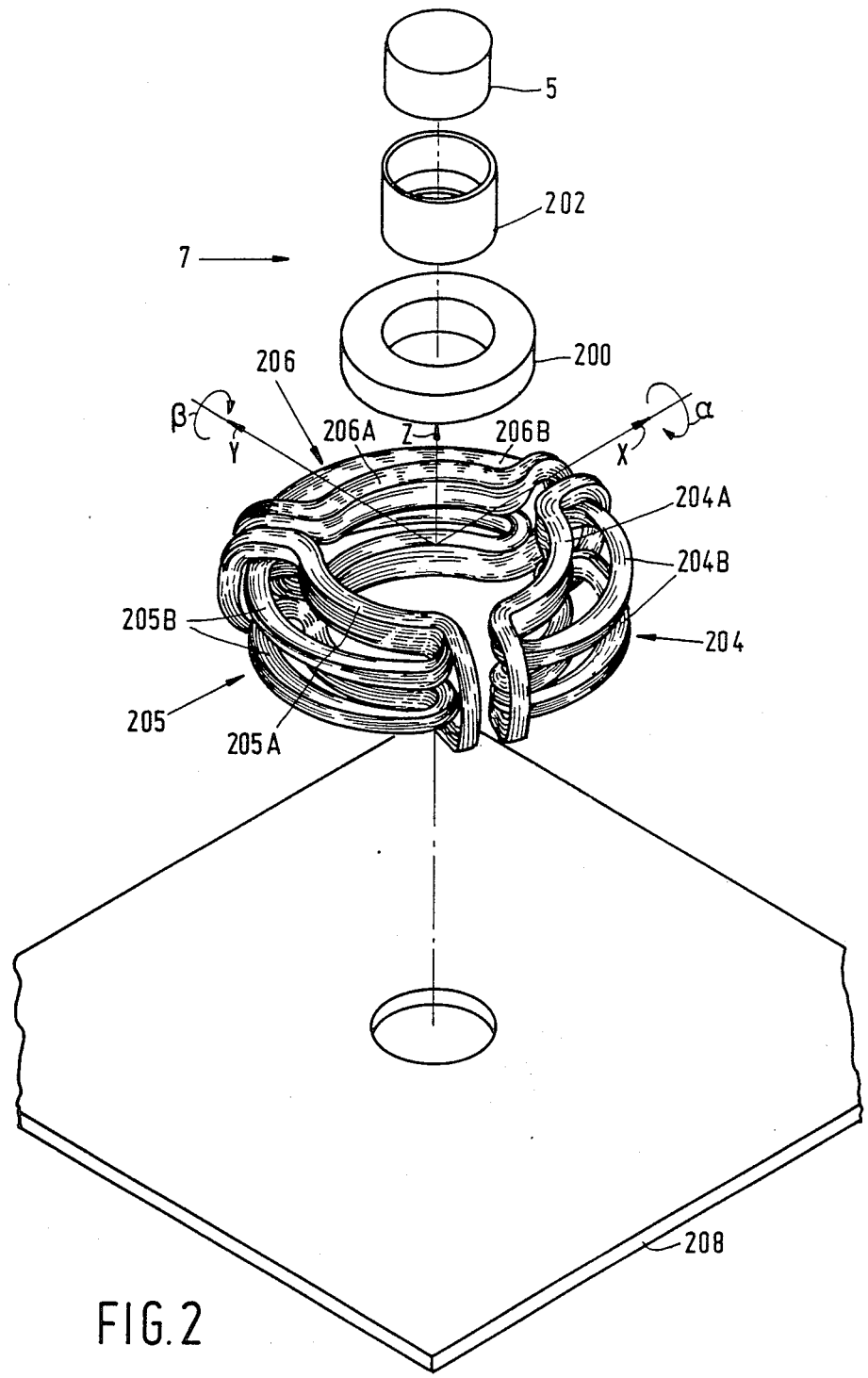
Figure 3:
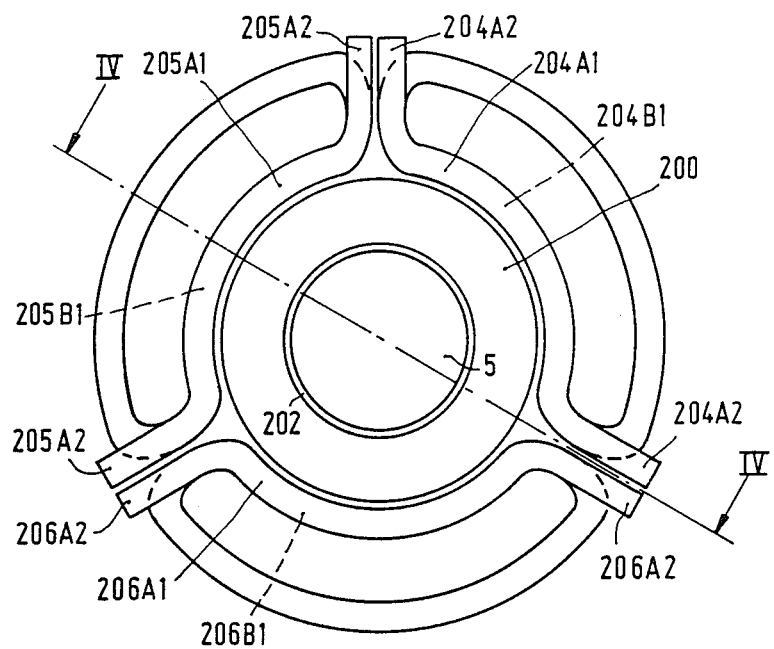
Figure 4:
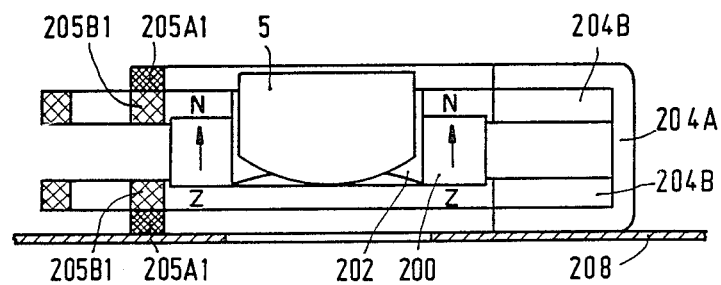
Figure 6:
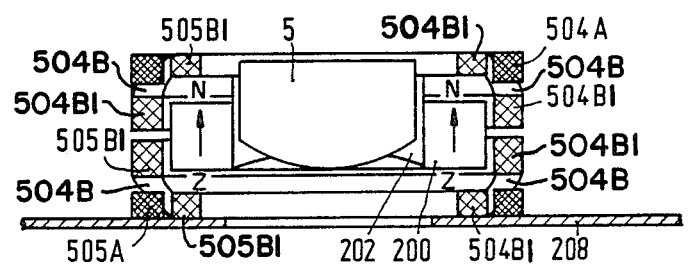
Figure 5:
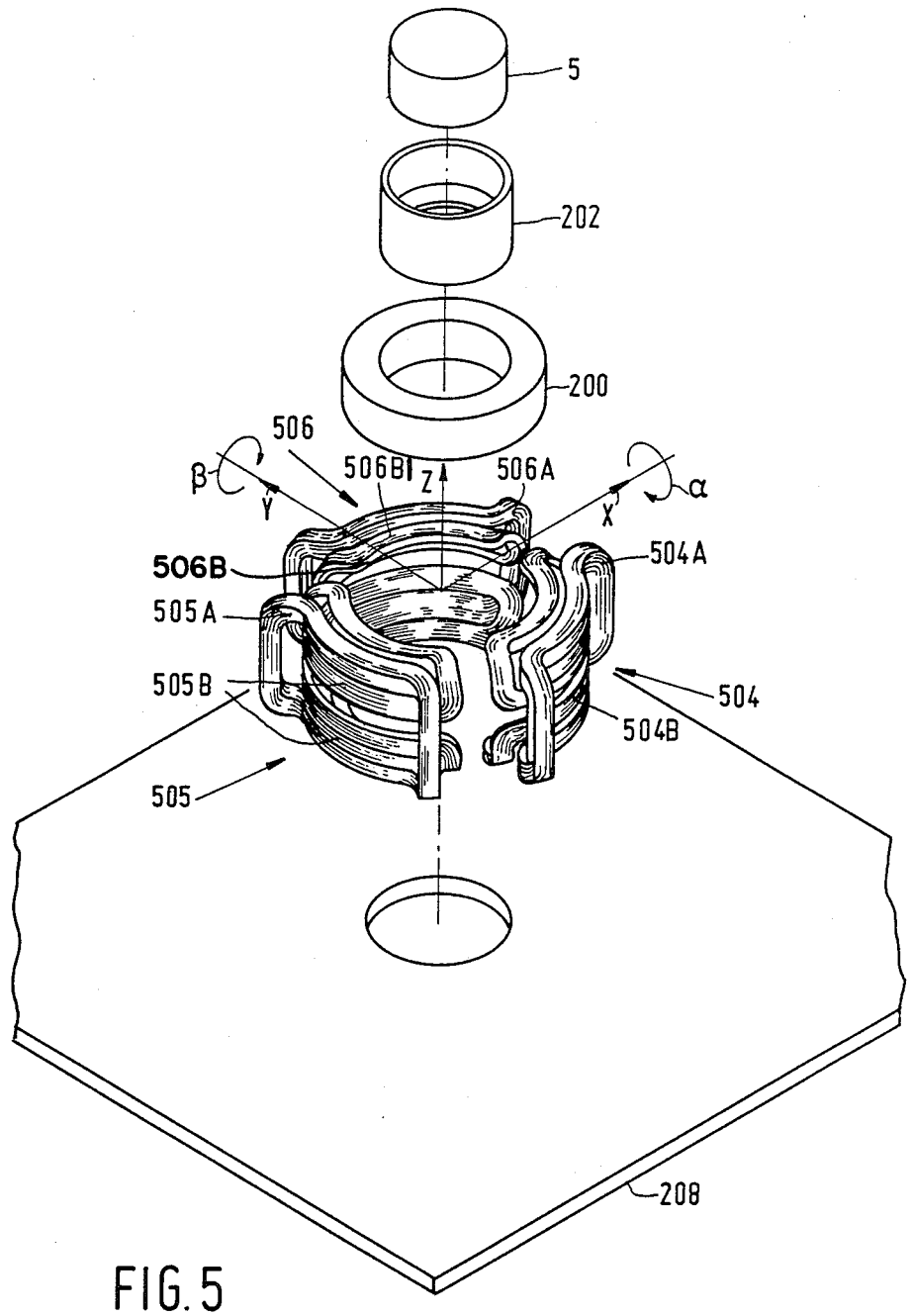

Embodiments of the invention will be explained in detail below with the aid of the drawings wherein FIG. 1 is a schematic representation of part of the scanning unit of the invention, FIG. 2 is an exploded view of a first embodiment of the drive according to the invention, FIG. 3 is a top view of the drive illustrated in FIG. 2, FIG. 4 is a section along the line IV—IV in FIG. 3, FIG. 5 is an exploded view of a second embodiment of the drive of the scanning unit according to the invention, FIG. 6 is a longitudinal section through the drive shown in FIG. 5.

Figure 7:
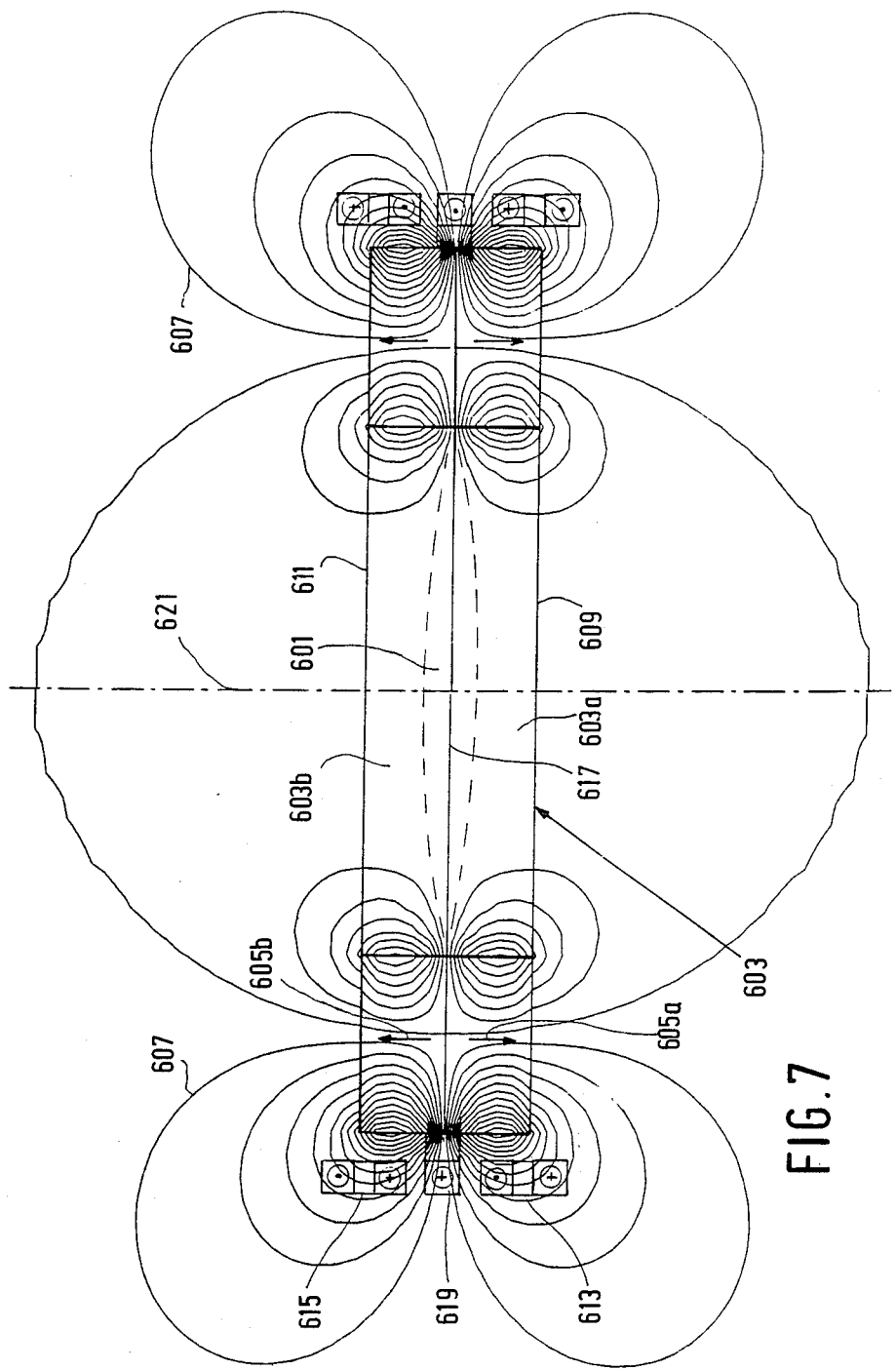

FIG. 7 a section through an optical scanning unit with a two-part permanent-magnetic magnetic body which supports the objective, with coil sets, arranged outside the magnetic body, in the area of the axial ends, and with an annular coil in the area of the radial central plane located between the coil sets.

Figure 8:
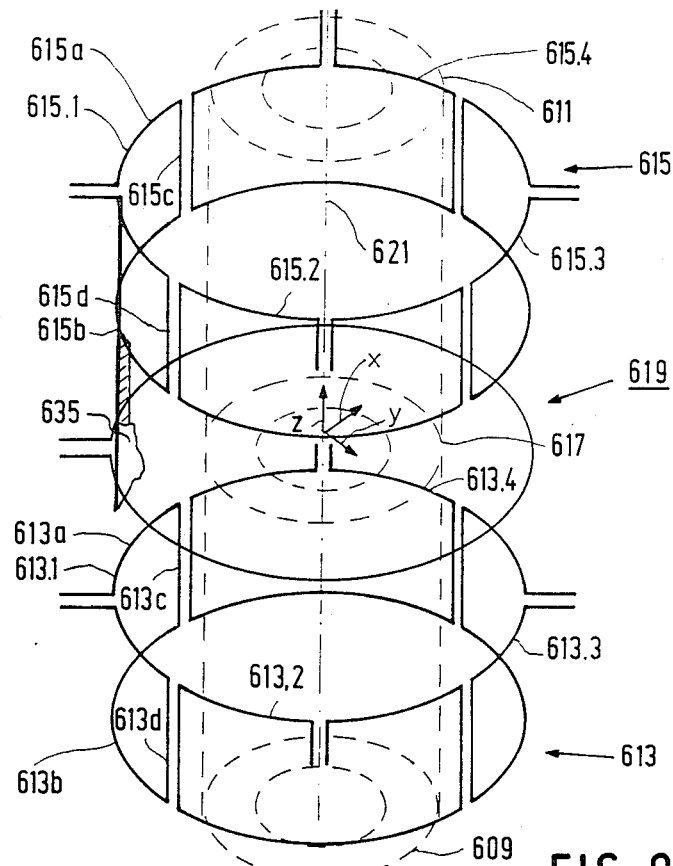
Figure 12:
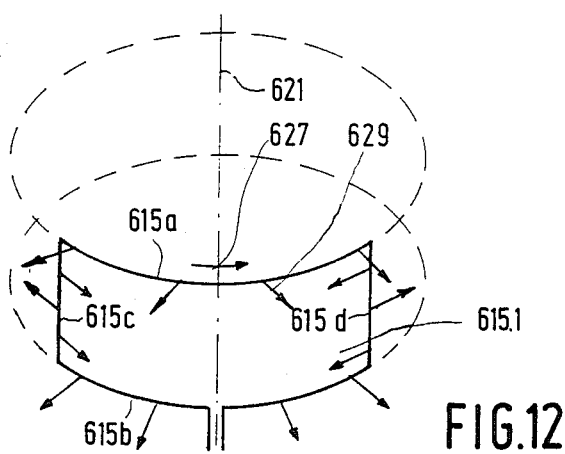
Figure 9:
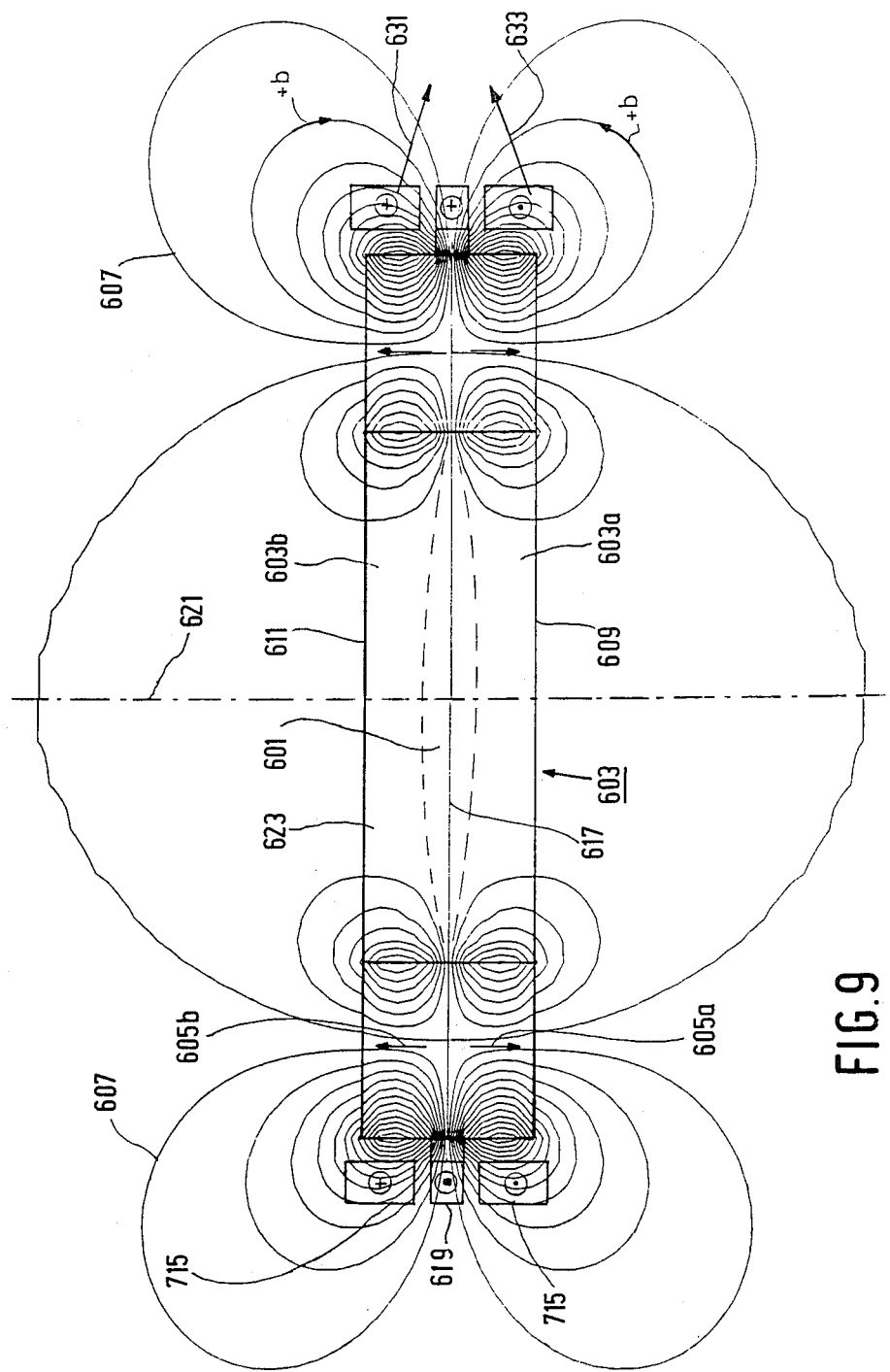
Figure 10:
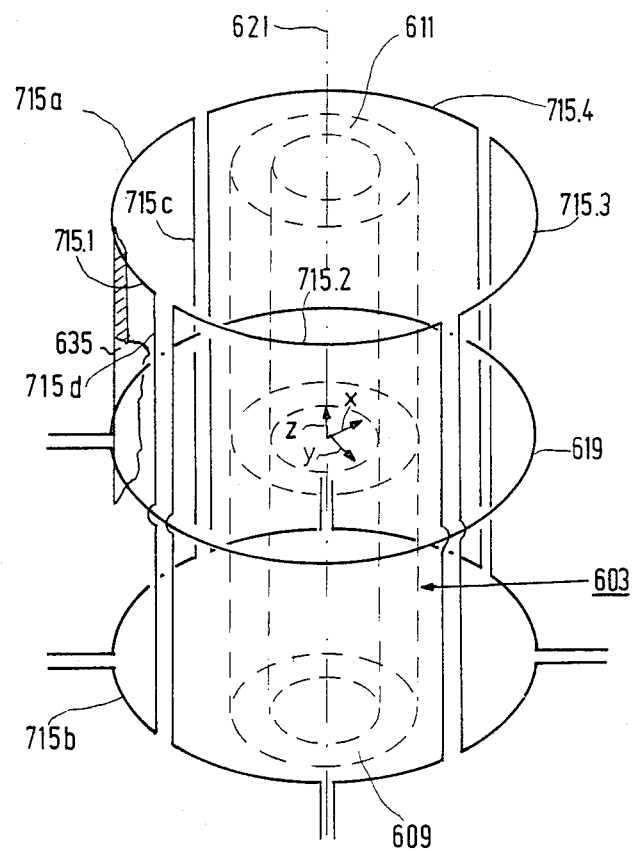
Figure 11:
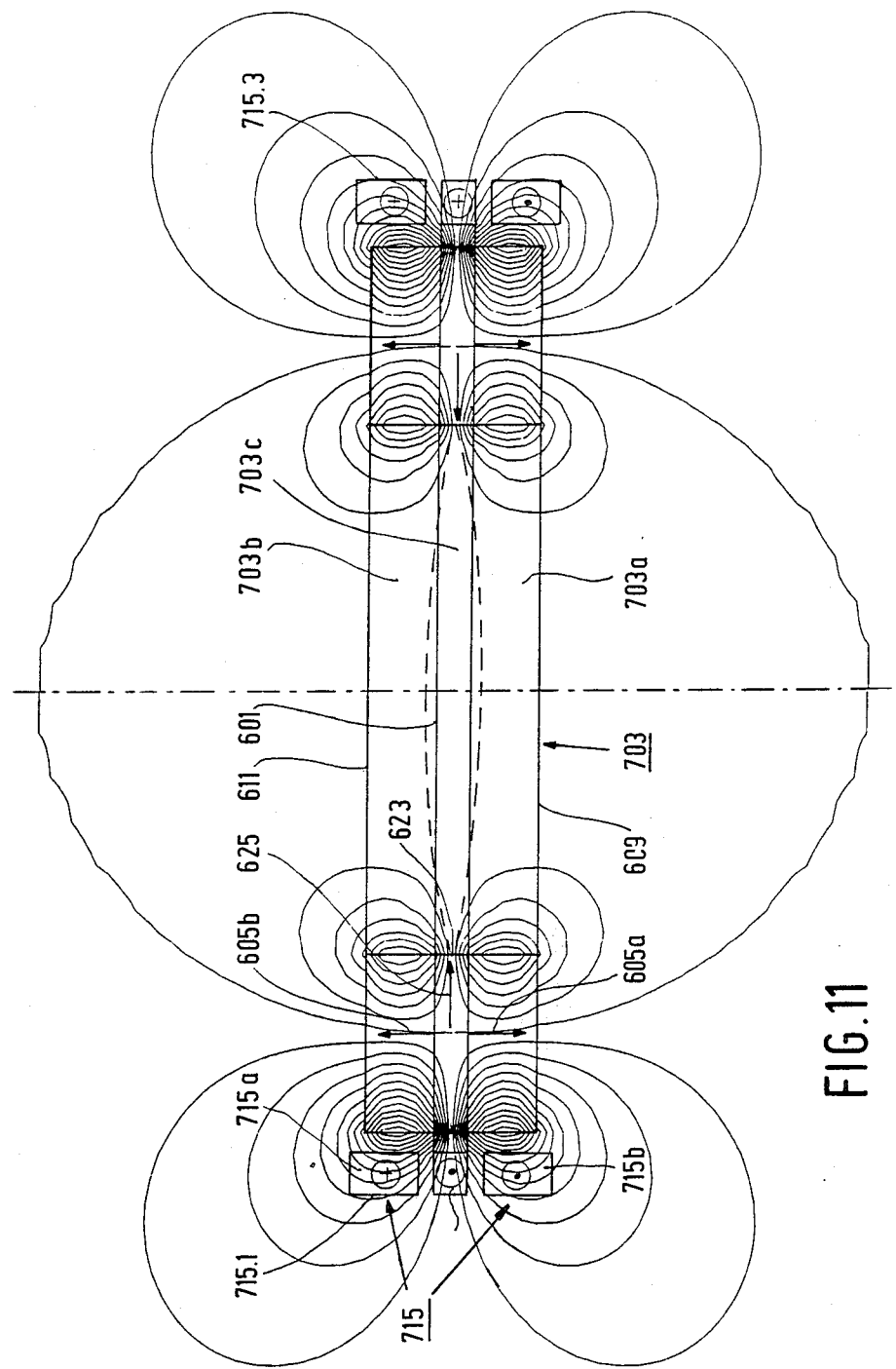
Figure 13:
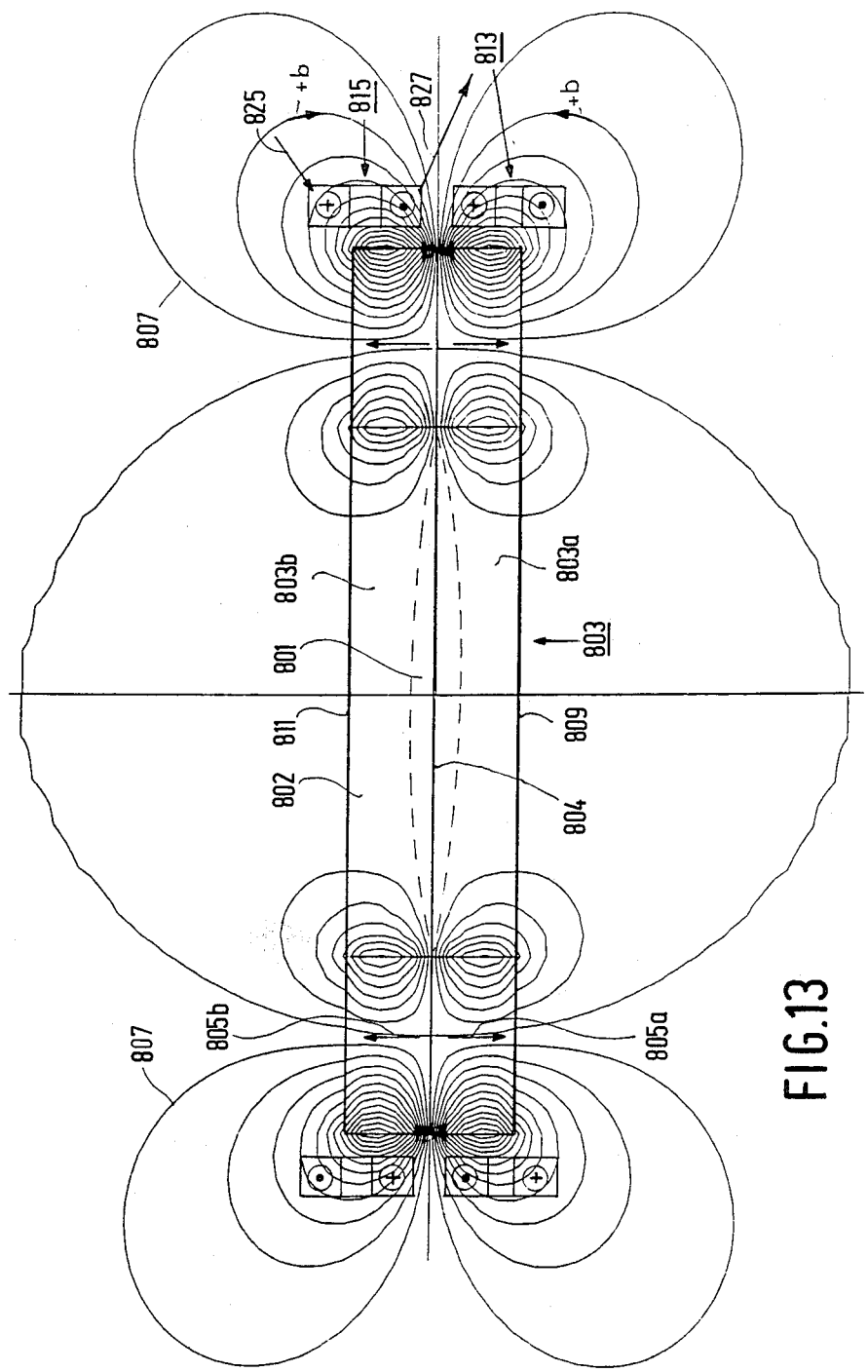
Figure 14:
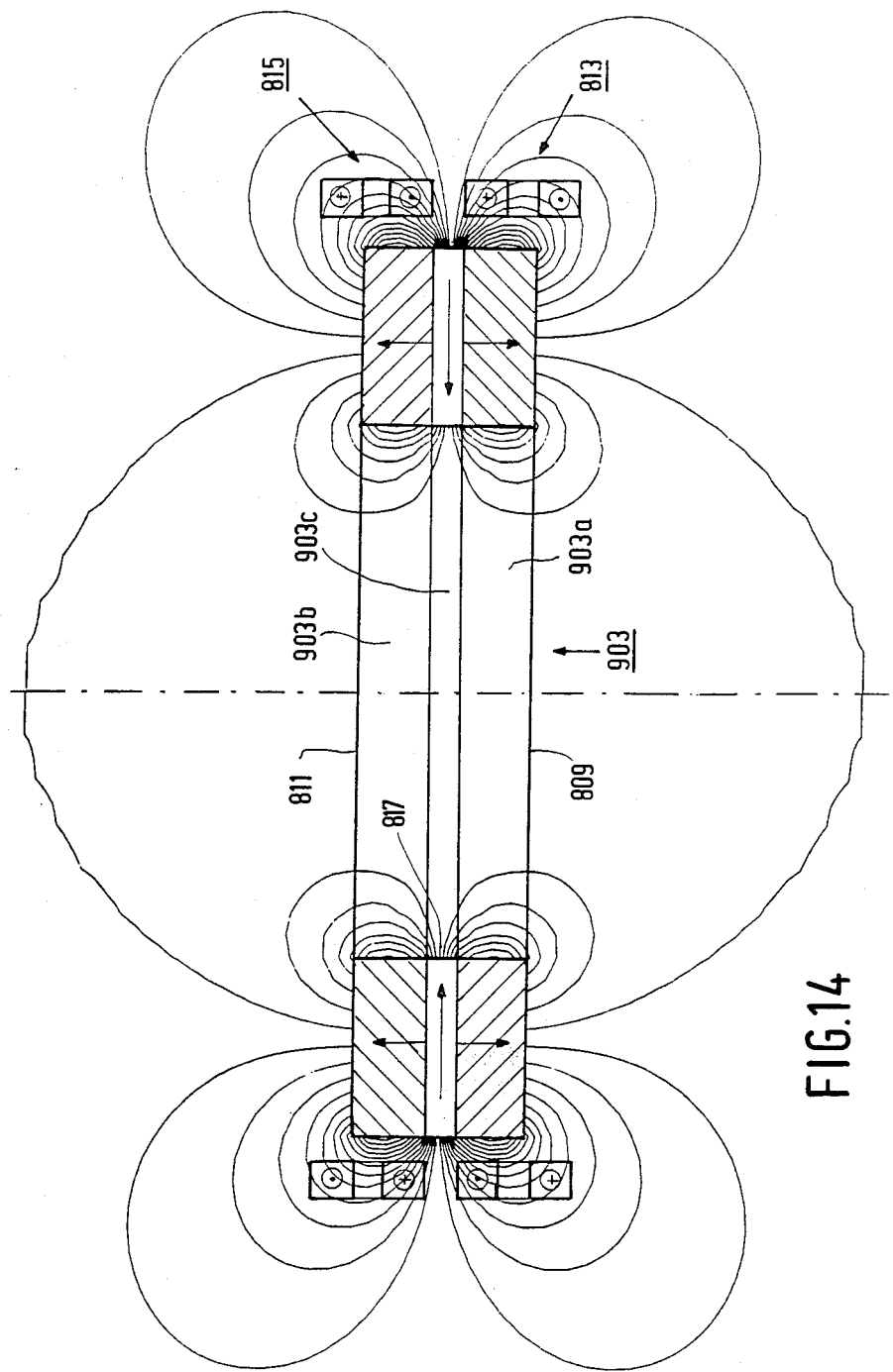
Figure 15:
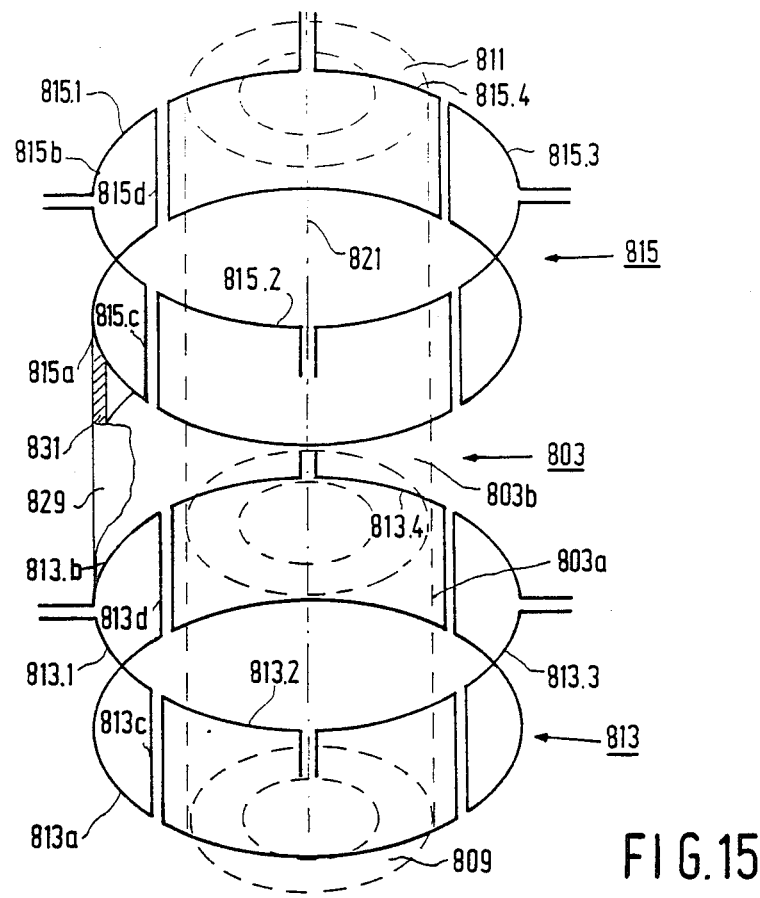
Figure 16:
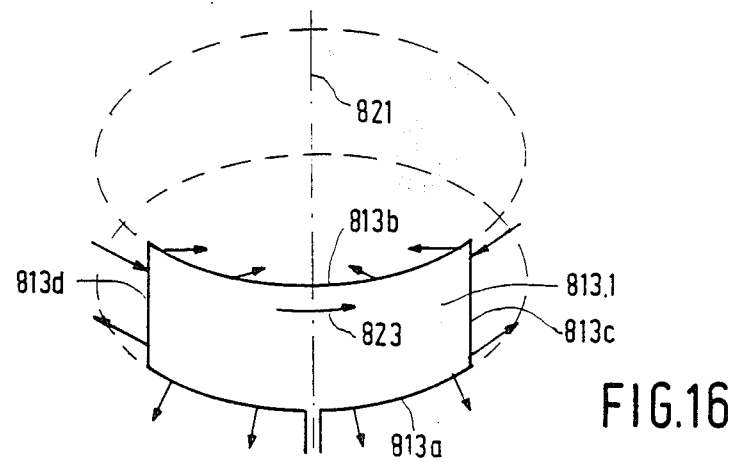
Figure 17:
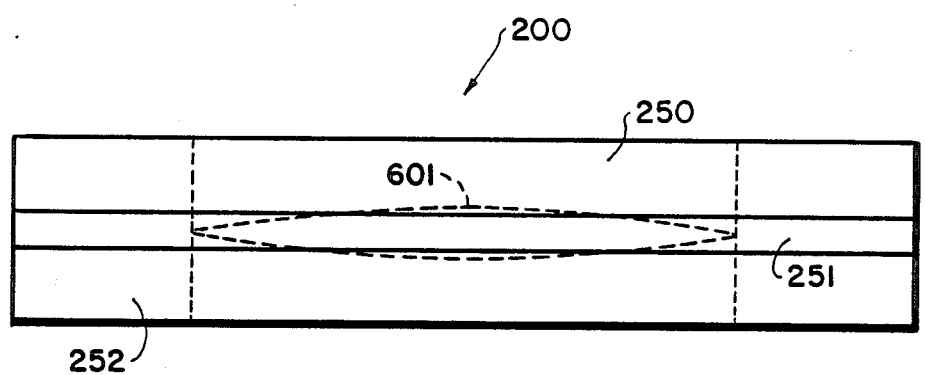

FIG. 8 is a simplified diagrammatic representation of the embodiment shown in FIG. 7, FIG. 9 is a modified version of the embodiment in FIG. 7, in which only one coil set is used, the coil parts running in the peripheral direction are arranged, on the one hand, in the area of one axial end of the magnetic body and, on the other, in the area of the other axial end, where, once again, the annular coil is located in the radial central plane between the coil parts situated at the ends, FIG. 10 is a simplified diagrammatic representation of the optical unit in FIG. 9, FIG. 11 is a magnetic body consisting of several magnetic parts, FIG. 12 is a representation of a segmental coil of the coil set in FIG. 10 with the driving forces emanating from this segmental coil, FIG. 13 is a section through a modified optical scanning unit with the coils and the magnetic fields of the magnetic body, FIG. 14 is a modification of the two-part magnetic body with an intermediate part between the two magnetic parts, FIG. 15 is a diagrammatic representation of the construction of the coil sets as shown in FIG. 13 and of the magnetic body arranged in the coil sets, FIG. 16 is a segmental coil of a coil set as shown in FIG. 10 with the dynamic effect originating from it, FIG. 17 shows a three part magnetic body.

The scanning unit shown in FIG. 1 has a radiation source 1, for example a diode laser, a collimator lens 3 and an objective 5 with an optical axis 5A. The objective is arranged in an objective mount 7 of an electromagnetic drive which will be described in detail subsequently. The collimator lens 3 and the objective 5 can have several lens elements, but consist preferably of a single lens element with at least one aspherically refracting surface. In this arrangement, the objective comprises only one objective lens which was produced by a replica method, the objective lens being equipped with a ring-shaped mirror 9 for a position detection system not described in detail here. Such a position detection system is described in Dutch Pat. No. 8501665 which corresponds to U.S. Pat. No. 4,638,471 herewith incorporated by reference.

The divergent beam of rays b supplied by the radiation source 1 is converted by the collimator lens 3 into a parallel beam which fills the aperture of the objective 5 perfectly. The objective focusses the beam of rays into a diffraction-limited radiation spot V with a diameter of, for example, 1 μm on the information surface 11 of a disc-shaped information carrier 13 of which a small part is shown in radial section in FIG. 1. The information is arranged in centric tracks 15 or quasi-concentric tracks which form a spiral track. The information consists of a plurality of optically detectable information regions between which there are intermediate regions. Preferably, the information surface 11 is close to the top of the information carrier 13 so that the beam b passes through the transparent substrate 17 of the information carrier before it reaches the information surface. The information surface is, preferably, radiation-reflecting so that the beam is reflected in the direction of the radiation source.

In the case of a rotating information carrier the beam reflected from the information surface is modulated in accordance with the sequence of information regions and intermediate regions in the track being read. The modulated beam is separated from the beam emitted from the radiation source, by an uncoupling element 19 in the form, for example, of a part prism. The separating plane 21 of the prism reflects at least part of the reflected beam to the radiation-sensitive detector 23 positioned in the radiation path. The detector 23 converts the modulated beam into an electrical signal which, in the known manner, is processed into a signal which, depending on the form of the information stored in the information carrier, can be made visible or audible or processed in another way.

On the righthand side of FIG. 1 there is drawn an orthogonal coordinate system XYZ which must be considered to have its origin O at the point M so that the z-axis coincides with the principal ray L of the beam b. The Z-axis extends in the axial direction, and this is the direction in which the objective must be able to be moved in order to focus the beam b in the light spot V. The X-axis and the Y-axis extend in the radial and tangential directions, respectively, with respect to axis of rotation of the information carrier. Because the light spot V has to follow the tracks of the rotating information disc as closely as possible, it is necessary for the objective 5 to make straight-line movements along the X-axis and the Y-axis, as well as rotate about these axes. The movement of the objective along the Z-axis is also known as the focussing movement, while the other movements are also known as the track following and time-error correcting movements.

FIGS. 2 to 6 illustrate in detail several possible electromagnetic drives for the scanning unit of the invention. In principle, each drive comprises a flexibly suspended ring-shaped magnetic body and a number of fixed coils arranged around this body, the coils being arranged into three or four sets. The magnetic body is ring-shaped or sleeve-shaped and is made from a permanent-magnet material. The coils in the sets are located in specific parts of the magnetic force field of the magnetic body. In order for the objective to move in the above-described directions without parasitic resonances, the objective is magnetically mounted in the drive device so that there is no physical contact between the objective and the objective mount, on the one hand, and the remaining elements of the scanning unit on the other hand.

FIGS. 2, 3 and 4 show a drive with a magnetic body 200 which is axially magnetized, as indicated by arrows in FIG. 4, so that a south pole Z or a north pole N are formed at the axial ends of the magnetic body 200. Magnetic materials with a high energy content such as neodymium-iron-boron and samarium-cobalt are preferred.

The magnetic body 200 and a holding ring 202 form the objective mount 7 for the objective 5. Around the magnetic body 200 there are a number of coils on a support plate 208. The coils are subdivided in this embodiment into three sets which are designated as 204, 205 and 206. The sets 204, 205 and 206 are arranged uniformally about the magnetic body 200, i.e. adjacent to one another, as seen in the peripheral direction of the magnetic body 200, and together form a more or less closed shell around the magnetic body 200. Instead of three sets it is also possible to arrange the coils into four or more than four sets in the manner illustrated. Each of the sets 204, 205 and 206 has a first segmental coil 204A, 205A or 206A respectively which is shaped and arranged in such a way that two active coil parts 204A1, 205A1 or 206A1 of the three segmental coils are located close to the magnetic body and, in fact, in regions where the magnetic field lines are directed mainly radially. When segmental coils 204, 205, 206 are excited, they can therefore exert magnetic force, produced along the Z-axis, on the magnetic body so that the objective 5 is moved for focussing purposes, out of the central position shown in FIG. 4. The above-mentioned active coil parts are connected to one another in pairs by inactive coil parts 204A2, 205A2 or 206A2 respectively.

Each of the sets 204, 205 and 206 is further provided with two second segmental coils 204B, 205B and 206B which extend parallel to one another. These segmental coils are banana-shaped and are arranged more or less in the above-mentioned first segmental coils 204A, 205A and 206A, respectively. The second segmental coils 204B, 205B and 206B each have an active coil part 204B1, 205B1 and 206B1 facing the magnetic body 200 and located in a part of the magnetic field of the magnetic body 200 where the field lines run mainly axially. When current is passed through, therefore, the second segmental coils can exert mainly radially directed magnetic forces on the magnetic body 200 which in the case of certain combinations of excited coils form turning moments. From what has been said above, it is probably clear that be selective actuation of the second magnetic coils 204B, 205B and 206B the objective 5 is moved along the X-axis and the Y-axis and can be tilted about the X-axis and the Y-axis for the purpose of track following and time correction, as already mentioned, when a rotating optical disc is being read.

The electromagnetic drive illustrated in FIGS. 5 and 6 is largely the same as the drive described above and is therefore only described briefly. Once again, the drive has a magnetic body 200, in which the mount 202 with the objective 5 is secured. The drive also has three sets of magnetic coils 504, 505 and 506 which are arranged around the magnetic body 200 in the manner already described. For securing the coils, a frame is required, and the supporting plate 208 of this frame is represented schematically. Each of the sets 504, 505 and 506 is comprised of three segmental coils, namely a first segmental coild 504A, 505A and 506A respectively and two second segmental coils 504B, 505B and 506B respectively. As regards shape, position and function, the first segmental coils 504A, 505A and 506A are the same as the first segmental coils 204A, 205A and 206A of the embodiment described above and are not described in any further detail. The two second segmental coils 504B, 505B and 506B of each of the sets 504, 505 and 506 are in tandem when viewed in the focussing direction. Each of the segmental coils 504B, 505B and 506B are more or less wing-shaped or curved and have two active coil parts 504B1, 505B1 and 506B1 each of which is positioned in a region of the magnetic field of the magnetic body 200 where the field lines extend mainly parallel to the Z-axis. The shape and alignment of the second segmental coils 504B, 505B and 506B enable rapid and very precisely defined track following and time correction movements of the objective, namely be straight-line movement along and rotation about the X- and Y-axes of the magnetic body 200.

For the sake of completeness it should be mentioned that the tilting movements of the objective about the said X- and Y-axes can be achieved by actuation of the first segmental coils, by actuation of second segmental coils or by combined actuation of first and second segmental coils in the illustrated embodiments.

In the optical scanning unit illustrated in FIG. 7, an objective 601, indicated schematically by dash-dot lines, is arranged in a permanent-magnetic body 603. This magnetic body has two magnetic parts 603a and 603b. Both parts 603a and 603b are axially magnetized in the opposite direction, as indicated by the arrows 605b and 605a. As a result of the magnetization illustrated by arrows 605a and 605b, a magnetic field indicated by the magnetic field lines 607 is formed outside the magnetic body 603.

Coil sets 613 and 615 are arranged around the magnetic body 603 in the region of its axial ends 609, 611. A toroidal coil 619 is arranged around body 603 in the area of the connecting surface 617 between the magnetic parts 603a and 603b. The construction of the overall coil arrangement is illustrated disgrammatically in FIG. 8. For the purpose of illustration, the coil construction as a whole has been considerably enlarged. In a practical version, the coil arrangement and axial sleeve length are only a few millimeters high.

Around the permanent-magnetic body 603, indicated only schematically in FIG. 8, are arranged the coil sets 613 and 615 between which the annular coil 619 is fitted. Coil sets 613 and 615 are the same in design and construction.

Each of the coil sets 615, 613 has several segmental coils 615.1, 615.2, 615.3, 615,4 or 613.1, 613.2, 613.3, 613.5, respectively. The individual segmental coils are in the form of sections of a cylindrical shell which fit together in the peripheral direction of the cylinder to form a cylindrical shell. For this purpose, each individual segmental coil 613.1 to 615.4 comprises two arc-shaped coil parts 613a, 613b and 615a, 615b respectively. The respective coil parts 613a and 615a together form a composite upper coil ring, whereas all the coil sections 613b or 615b jointly form a lower composite coil ring. All the coil parts 613a, 613b and 615a, 615b have the same curvature and all are approximately the same distance away from the central axis 621. In the case of each segmental coil 613.1 to 615.4, the coil parts 613a and 613b and 615a and 615b are connected to one another by connecting links 613c and 613d and 615c and 615d. These connecting links run in the direction of or parallel to the axis 621. The connecting links 613c, 613d and 615c, 615d are of practically no significance for the control system, whereas coil parts 613a and 613b, 615a and 615b jointly contribute towards the control of the position of the magnetic body 603 within the coil arrangement. By different actuation of the individual segmental coils it is possible to move the body 603 in the coordinate axes X, Y, Z, as well as to rotate it about two of these axes.

FIGS. 9 and 10 show a simplified scanning unit in which only one segmental coil set 715 is provided. The magnetic body 603 once again has two magnetic parts 603a and 603b which are axially magnetized at the axial ends 609 and 611 in the direction of the arrows 605a and 605b. The two magnetic parts 603a and 603b are joined to one another along a surface 617. Once again, the lens 601 is arranged within the inside 623 of the body 603. Again, the magnetic fields of the magnetic body 603 produce the magnetic field lines 607.

The set of segmental coils 715 is arranged around the magnetic body 603 and coaxially to it. Segmental coil set 715 comprises, for example, four segmental coils 715.1, 715.2, 715.3 and 715.4. The individual segmental coils form sections of a cylindrical shell and join together in the peripheral direction of the cylinder to form a cylindrical shell. This cylindrical shell encloses the magnetic body 603. Each individual segmental coil 715.1 to 715.4 has two coil parts 715a and 715b. Both the coil parts 715a and the coil parts 715b join together in the region of the upper end 611 or the lower end 609 to form composite coil rings which enclose ends 611 and 609 with some clearance. The coil parts 715a and 715b all have the same curvature and approximately the same clearance from the central axis 621. The coil parts 715a and 715b of segmental coils 715.1 to 715.4 are connected at their ends by connecting links 715c and 715d. These connecting links 715c and 715d run parallel to the axis 621 and therefore in the axial direction.

The toroidal coil 619 is provided between coil parts 715a and 715b. The toroidal coil and the individual segmental coils can be actuated separately by an electronic control unit. Whereas the toroidal coil 619 effects adjustment only in the axial direction, i.e. in the Z direction, coil parts 715a and 715b can also effect adjustments in the direction of the X and Y coordinate axes, depending on how they are actuated.

As shown in FIG. 17, the magnetic body 200 may be formed by three superposed rings 250, 251 and 252. The two outer parts or rings 250 and 252 are magnetic and are magnetized in the axial direction. The intermediate ring or part 251 in this embodiment is non-magnetic. As in the embodiment shown in FIG. 7, the objective 601 is mounted within the assembly formed by the three annular parts 250, 251 and 252.

FIG. 11 shows a magnetic body 703 which has three magnetic parts 703a, 703b and 703c. The magnetic parts 703a and 703b are permanently magnetized in opposite directions. This is indicated by the magnetization arrows 605a and 605b. in this embodiment, the intermediate part 703c is permanent-magnetic and is magnetized in the direction of the inside wall 623. This is represented by arrow 625. In accordance with this magnetization, the north poles of parts 703a and 703b are located in the area of the axial ends 609 and 611, while the north poles of the intermediate part 703c are situated towards the inside wall 623. In the embodiment of the magnetic body 703 illustrated in FIG. 11, a coil arrangement is used like that which was described in reference with FIGS. 9 and 10. Consequently, there are only segmental coils 715.1 to 715.4 (only 715.1 and 715.3 being shown in FIG. 11) coils parts 715a and 715b being located in the area of the axial ends 609 and 611.

With the aid of the example of an individual segmental coil 615.1, FIG. 12 illustrates, using several arrows 629, the effect of forces, originating from the individual coil parts 715a and 715b and the connecting links 615c and 615d, when a current flows in the direction of arrow 627. The effects of connecting links 615c and 615d clearly cancel each other. This means that the effects of the forces from the connecting links running parallel to the central axis can make neither a positive nor a negative contribution to the control of the magnetic body. Things are different in the case of coil parts 615a and 615b. The arrows originating from these coil parts show that, when current is flowing in the direction indicated by the arrow 627, the actions of the forces of these coil parts are outwards. If the current were flowing through the coil 615.1 in the reverse direction, then the actions of the forces would be directed inwards. By appropriate actuation of the individual coil parts, therefore, it is possible adjust the position the magnetic body inside the coil arrangement. In accordance with the representation in FIG. 12, FIG. 9 contains force arrows 631 and 633 indicating the direction of force from the individual coil parts. The +b arrows in FIG. 9 indicate the direction of flux of the field lines.

The coils 613.1 to 613.4; 615.1 to 615.4; 715.1 to 715.4 and 619 of the optical unit can be mounted as laminar conductors on an insulating cylinder 635 made, for example, from resin-bonded paper etc. Such a construction, as indicated in FIGS. 8 and 10, is simple and suitable for mass production.

The objective 801 indicated by a dash line in FIG. 13 is arranged on the inside 802 of a permanent-magnetic body 803. The magnetic body consists of two magnetic parts 803a and 803b which are secured to one another, by adhesive for example, along a surface 804. The magnetic field which forms around the magnetic body 803 is indicated by the magnetic field lines 807. Because of the magnetization in opposite directions the north poles of the magnetic parts 803a and 803b are in the region of the axial ends 809 and 811.

Two segmental coil sets 813 and 815 are arranged around the magnetic body 803 at a distance permitting free movement of the magnetic body 803. The segmental coil set 813 and the segmental coil set 815 roughly surround the axial ends 809 and 811.

As FIG. 14 shows, the magnetic body 903 may also comprise two magnetic parts 903a and 903b between which there is an intermediate part 903c. In the embodiment in FIG. 14 the magnetization is selected in such a way that, like the magnetization in FIG. 13, the magnetic parts 903a and 903b are magnetized in the direction of the axial ends 809 and 811. The intermediate part in this case is magnetized in the direction of its inside wall 817. These directions of magnetization mean that the north poles of magnetic parts 903a and 903b are at the axial ends 809 and 811 and the north poles of the intermediate part 903c are at the inside wall 817 of the intermediate part. For the embodiment in FIG. 14, the arrangement of the segmental coil sets 813 and 815 is the same as the arrangement of these segmental coil sets in FIG. 13.

By means of a diagrammatic representation extended in the axial direction, FIG. 15 shows the coil arrangement surrounding the magnetic body 803. The magnetic body 803 is indicated only by its magnetic parts 803a and 803b and by its axial ends 809 and 811. The segmental coil sets 813 and 815 each consist of four segmental coils. Thus the segmental coil set 813 comprises the segmental coils 813.1, 813.2, 813.3, 813.4. The segmental coil set 815 comprises the four segmental coils 815.1, 815.2, 815.3, 815.4. Each segmental coil 813.1 to 815.4 is designed as a section of a cylindrical shell. All the segmental coils 813.1 to 813.4 and 815.1 to 815.4 when combined form two cylindrical shells which surround the magnetic body 803, axially offset with respect to one another.

Each individual segmental coil 813.1 to 813.4 or 815.1 to 815.4 comprises similarly curved and axially offset coil parts 813a and 813b and 815a and 815b respectively. All the coil parts 813a, 813b and 815a, 815b of all segmental coils 813.1 to 815.4 are equidistant from the central axis 821 and all, therefore, have a controlling effect on the magnetic body 803.

The coil parts 813a and 813b as well as 815a and 815b of all individual coils are connected to one another via connecting links 813c and 813d or 815c and 815d respectively. These connecting links 813c and 813d or 815c and 815d run parallel to the axis 821. The connecting links of adjacent segmental coils are directly next to one another. As will be explained later, these connecting links have scarcely any influence on the control or adjustment of the magnetic body 803.

FIG. 16 shows a schematic diagram of a segmental coil 813.1 which is representative of all the segmental coils 813.1 to 815.4. As FIG. 15 shows, these segmental coils have coil parts 813a and 813b curved about the axis 821 which are connected to one another by connecting links 813c and 813d. Current flows through segmental coil 813.1 in the direction of the arrow 823. The result of this current flow is that the field forces of coil part 813a are directed outwards and down and the field forces of 813b are directed inwards and down. The field forces of the connecting links 813c and 813d run separately in the peripheral direction. The pattern of forces reveals that the actions of the forces of the connecting links 813a and 813d cancel each other around the individual segmental coils and are therefore ineffective. On the other hand, the actions of the forces of coil parts 813a and 813b can be utilized to exert controlling influence on the magnetic body.

With the aid of the arrows 825 and 827, FIG. 13 depicts field forces originating from one of the segmental coils of the segmental coil set. From this it is possible to derive the field forces exerted on the magnetic body 803. The +b arrows indicate the pattern of the field flux along the field line.

The construction of the coil arrangement of the optical unit is particularly suitable for mass production if all the coils 813.1 to 815.4 are mounted, for example, in the form of laminar conductors on to the surface 829 of an insulating cylinder 831 of resin-bonded paper, for example, etc. as indicated in FIG. 15.

What is claimed is:

1. An optical scanning unit for controlling the position of a radiation beam with respect to tracks on the surface of an information carrier, wherein the scanning unit comprises an objective having an optical axis and a lens for focussing the beam into a scanning spot on said surface, an electromagnetic drive for continuous correction of the position of the objective with respect to the information carrier, the drive comprising a mount for the objective, said objective mount having a movable ring-shaped magnetic body of permanent-magnetic material arranged coaxially with the optical axis, said magnetic body being axially magnetized with magnetic poles at the axial ends thereof, the drive further comprising at least three fixed coil sets which interact magnetically with said magnetic body through an air gap, wherein said sets are arranged uniformally about the periphery of the magnetic body, each coil set having a first segmental coil which has two active parts axially spaced from each other, said active coil parts being spaced by equal distances from the magnetic body and extending along the periphery thereof, wherein each active coil part is located in the vicinity of one of the axial ends of the centrally positioned magnetic body, the two active coil parts being joined together by axially extending further coil parts, and including at least one second coil which is positioned at least partially between said two active coil parts.

2. An optical scanning unit as in claim 1, wherein said second coil of each of said sets has two coil segments extending parallel to one another in a side by side relationship, when viewed in the axial direction of the magnetic body, each of said coil segments having a coil part facing the magnetic body and extending along the periphery thereof and another coil part which is further removed from the magnetic body.

3. An optical scanning unit as in claim 1, wherein said second coil of each of the sets has two coil segments arranged in side by side relationship when viewed in the axial direction of the magnetic body, each of the coil segments having active coil parts at equal axial distances from the magnetic body and extending around it, one of the active coil parts of said segments being next to the magnetic body and being connected to the other active coil part of the respective segment by further coil parts angled to the magnetic body, said other active coil part being situated opposite the magnetic pole at one end of the magnetic body.

4. An optical scanning unit as in claim 1, wherein said magnetic body is comprised of a pair of annular, magnetic parts arranged axially on top of one another, and including an annular coil extending around the magnetic body in a radial plane.

5. An optical scanning unit for controlling the position of a radiation beam with respect to tracks on the surface of an information carrier, wherein the scanning unit comprises an objective having an optical axis and a lens for focussing the beam into a scanning spot on said surface, an electromagnetic drive for continuous correction of the position of the objective with respect to the information carrier, the drive comprising a mount for the objective, said mount having a movable, ring-shaped body arranged coaxially with the optical axis, said body being comprised of permanent-magnetic, axially superimposed parts which are axially magnetized, and wherein the drive further comprises at least three sets of fixed segmental coils which interact magnetically with said magnetic body through the air gap, said sets being arranged uniformally about the periphery of said magnetic body, each individual coil set having two active coil parts at an equal distance from the magnetic body and extending about it, one of said active coil parts being located adjacent an axial end of and being centrally positioned with respect to the magnetic body and the other active coil part being displaced axially towards the centre of the magnetic body, these two coil parts being connected by axially extending further coil parts.

6. An optical scanning unit as in claim 5, including an annular coil which is positioned between the segmental coils of the coil sets and extends around the centre of the magnetic body in a radial plane.

7. An optical scanning unit as in claims 4, 5, or 6, in which all the segmental coils of the coil sets and the annular coil comprise laminar conductors which are mounted on a cylindrical carrier which surrounds the magnetic body.

8. An optical scanning unit as in any one of claims 4, 5 and 6 including an intermediate part, which is non-magnetic, soft-magnetic or permanent-magnetic, arranged between the permanent-magnetic parts of the magnetic body.

9. An optical scanning unit as in claim 5, in which the parts of the magnetic body are permanently magnetized in opposing directions.

10. An optical scanning unit as in claim 9, including a magnetic intermediate part arranged between said permanent-magnetic parts, the north poles of the permanent-magnetic parts of the magnetic body being oriented in the direction of the intermediate part and the north poles of the intermediate part being oriented towards its outside wall.

11. An optical scanning unit as in claim 9, including a magnetic intermediate part arranged between said permanent-magnetic parts, the north poles of the permanent-magnetic parts of the magnetic body being oriented towards the axial ends and the north poles of the intermediate part being oriented towards its inside wall.

12. An optical scanning unit for controlling the position of a beam of radiation with respect to tracks on an information carrier, said unit comprising an objective for focusing said beam along an optical axis into a scanning spot on the surface of said record carrier, and electromagnetic means for changing the position of said objective, said electromagnetic means including an annular permanent magnet arranged coaxially with said optical axis and being axially magnetized, means for mounting said objective in said magnet, and at least three sets of coils arranged uniformly about the periphery of said magnet and interacting magnetically therewith through an air gap therebetween, each of said sets having a first coil with two active coil parts axially spaced from each other, said active coil parts being spaced by equal distances from said magnet and extendiang along the periphery thereof, each active coil part being located adjacent a respective one of the axial ends of said magnet in a region where the magnetic field produced by said magnet is such that upon excitation of said active coil parts, a force is produced which acts on said magnet in a direction parallel to said optical axis so as to move said magnet and said objective mounted therein axially towards or away from said record carrier for focusing said beam, said coil sets each having at least one second coil positioned at least partially between said active coil parts, said second coil being positioned in a region where the magnetic field produced by said magnet is such that upon excitation of said second coils, forces are produced which move said magnet and said objective mounted therein along either one of two orthogonal axes which are perpendicular to said optical axis or tilt said magnet and objective about either one of said two orthogonal axes to thereby move said spot with respect to a given track.

13. A scanning unit as claimed in claim 12, wherein said magnet is comprised of two superimposed annular parts of permanent magnetic material, said parts being axially magnetized in opposite directions.

14. An optical unit as claimed in claim 13, including an annular coil centered axially with respect to and extending around said magnet.

15. A scanning unit as claimed in claim 13 or 14, including an intermediate annular member disposed between said rings.

16. A scanning unit as claimed in claim 15 wherein said intermediate member is made of magnetic material and is magnetized in the radial direction.

* * * * *